United States Patent

Akazawa et al.

[11] Patent Number: 4,899,364
[45] Date of Patent: Feb. 6, 1990

[54] AUTOMATIC GAIN CONTROL SYSTEM

[75] Inventors: Shigeo Akazawa; Masaharu Mori; Masahiro Hamatsu, all of Tokyo, Japan

[73] Assignee: Clarion Co., Ltd., Tokyo, Japan

[21] Appl. No.: 224,576

[22] Filed: Jul. 26, 1988

[30] Foreign Application Priority Data

Jul. 31, 1987 [JP] Japan ................. 62-192219
Oct. 23, 1987 [JP] Japan ................. 62-267763

[51] Int. Cl.⁴ .............................................. H04L 9/00
[52] U.S. Cl. ........................................................ 375/1
[58] Field of Search ....................... 375/1, 99; 380/34

[56] References Cited

U.S. PATENT DOCUMENTS

4,086,504 4/1978 Ezell et al. ..................... 375/1
4,291,410 9/1981 Caples et al. ................... 375/1
4,530,103 7/1985 Mosley, Jr. et al. ............ 375/1
4,630,283 12/1986 Schiff .............................. 375/1
4,641,322 2/1987 Hasegawa ....................... 375/1
4,710,723 12/1987 Pelchat et al. .................. 375/99

Primary Examiner—Salvatore Cangialosi
Attorney, Agent, or Firm—Wallenstein, Wagner & Hattis, Ltd.

[57] ABSTRACT

A spread spectrum receiver includes, for example, a correlator consisting of two convolvers whose correlation outputs are applied to a demodulator respectively via two variable gain amplifiers whose gains are controlled in response to a demodulation output from the demodulator.

12 Claims, 8 Drawing Sheets

AUTOMATIC GAIN CONTROL SYSTEM

FIELD OF THE INVENTION

This invention relates to a spread spectrum receiver, and more particularly to an improvement of an automatic gain control system thereof.

BACKGROUND OF THE INVENTION

Figure 4:
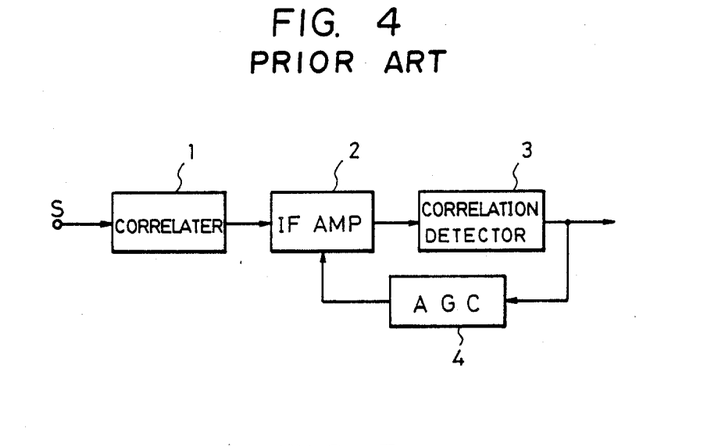
FIG. 4 is a block diagram of a prior art gain control system in a spread spectrum receiver.

FIG. 4 shows a prior art automatic gain control system used in a spread spectrum receiver. In this drawings, reference numeral 1 refers to a correlator, 2 to an IF (intermediate frequency) amplifier, 3 to a correlation detector, and 4 to an AGC (automatic gain control) amplifier.

The correlator 1 is supplied with a received spread-spectrum signal and gives a correlation output to the correlation detector 3 via the IF amplifier 2.

Figure 5:
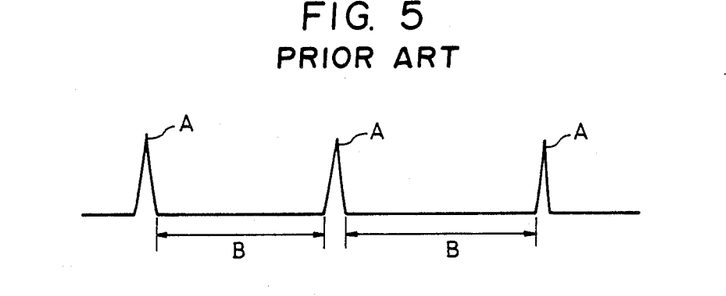
FIG. 5 shows a waveform of a correlation spike in the system of FIG. 4.

The correlation detector 3 produces an output which exhibits a correlation spike A as shown in FIG. 5. When the correlation spike A is large, the AGC amplifier 4 exhibits a large output level and controls the IF amplifier 2 to decrease its gain.

When the correlation spike A is small, the AGC amplifier 4 exhibits a small output level and controls the IF amplifier 2 to increase its gain.

As described, the prior art automatic gain control system uses the correlation detector for detecting an output of the IF amplifier. Therefore, when two convolvers are used as the correlator 1, two correlation detectors are required to detect respective correlation outputs from two convolvers, and this invites a complicated circuit arrangement and an increase in the manufacturing cost.

The prior art system also requires two IF amplifiers and corresponding two AGC amplifiers, and this further complicates the circuit arrangement.

Beside this, in case of a waveform such as the correlation spike A, an AGC circuit which follows the peak value is used generally. Such an AGC circuit is provided with a short time constant for electric charge and a long time constant for electric discharge. In this case, however, the AGC circuit, although quickly responsive to a change causing an increase of the correlation spike, exhibits a dull response to a change causing a decrease. Further, although the discharge time constant is long, the AGC circuit discharges little by little continuously when the correlation spike does not exist. Therefore, the AGC control voltage changes continuously, and this invites an erroneous operation caused by a noise or spurious response during absence of the correlation spike.

OBJECT OF THE INVENTION

It is therefore an object of the invention to provide a spread spectrum receiver having an automatic gain control system which is quickly responsive to the correlation spike alone to control the receiver to never increase the noise level and never degrade the signal-to-noise ratio.

A further object of the invention is to provide a spread spectrum receiver having an automatic gain control system suitable for the use of a correlator of a type producing at least two correlation outputs.

SUMMARY OF THE INVENTION

In order to achieve the objects, an inventive system includes a variable gain amplifier means which amplifies a correlation output and whose gain is controlled in response to a demodulation output of a demodulator which demodulates an output of the amplifier.

In a first preferred embodiment of the invention, two correlators and two corresponding variable gain amplifiers are used, and a gain of each amplifier is controlled by a single AGC circuit in response to the demodulation output.

In a second embodiment of the invention, the correlation spike supplied from the demodulator is compared to two positive or negative threshold voltages in accordance with the polarity of the correlation spike, and the gain of the variable gain amplifier is controlled in response to a resultant comparison output so as to maintain the peak of the correlation spike between the said two positive or negative threshold voltages.

In a spread spectrum receiver having the automatic gain control system of the first embodiment, the gain of the variable gain amplifier for amplifying respective correlation outputs is controlled in response to a single demodulation output in lieu of an amplified output of the amplifier itself. Therefore, the system requires no correlation detector used in the prior art system. Further, since gain controls of respective amplifiers are effected simultaneously in response to a single demodulation output, a single AGC circuit suffices for these amplifiers.

DETAILED DESCRIPTION

The invention is described below in detail, referring to preferred embodiments illustrated in the drawings as using a multiplier as a demodulator.

Figure 1:
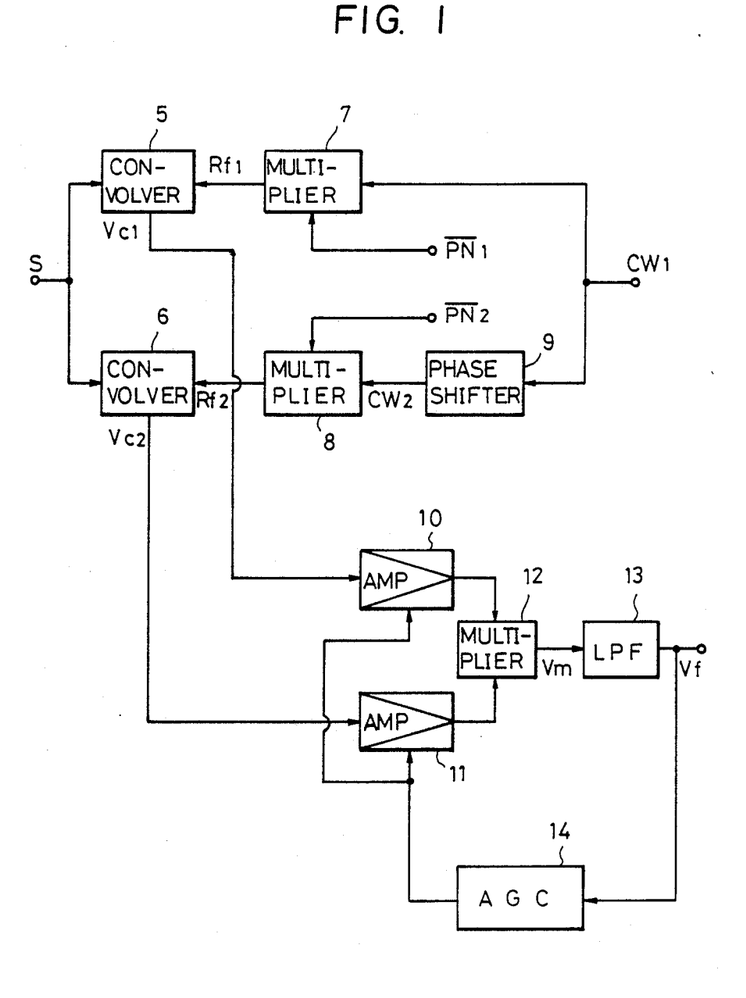
FIG. 1 is a block diagram of an embodiment of the invention.

FIG. 1 shows a general arrangement of an embodiment of an inventive spread spectrum receiver in which reference numerals 5 and 6 refer to convolvers, 7 and 8 to multipliers, 9 to a phase shifter, 10 and 11 to variable gain amplifiers, 12 to a multiplier used as a demodulator, 13 to a low-pass filter, and 14 to an automatic gain control circuit.

A received spread-spectrum signal is applied to one of the inputs of each convolver 5 (6) while the other ends of the convolvers 5 and 6 are supplied with first and second reference signals Rf1 and Rf2, respectively.

A CW signal $CW_1$ having the same frequency as an RF carrier signal of a spread-spectrum signal S is applied to one of the inputs of the phase shifter 9 and one of the inputs of the multiplier 7. The phase shifter 9 shifts the CW signal $CW_1$ by a predetermined value, e.g.

90 degrees, and gives it to one of the inputs of the multiplier 8.

The other ends of the multipliers 7 and 8 are supplied with PN codes $\overline{PN1}$ and $\overline{PN2}$, respectively, and their outputs are used as the first and second reference signals Rf1 and Rf2.

The convolvers 5 and 6 correlate the first and second reference signals Rf1 and Rf2 with the spread-spectrum signal S, respectively, and respective correlation outputs Vc1 and Vc2 are applied to the multiplier 12 via the amplifiers 10 and 11. The multiplier 12 gives its output to the low-pass filter 13 to obtain a data demodulation signal Vf.

It is explained below how the data demodulation signal Vf is obtained from the received spread-spectrum signal S in the above-described arrangement.

The received spread-spectrum signal S is expressed by:

$$S = Vd(t) = P_1(t)\text{SIN}(\omega_0 t) + A \cdot P_2(t)\text{COS}(\omega_0 t) \quad (1)$$

where P1(t) and P2(t) are first and second PN codes used in modulation in a transmitter's station, A is data which exhibits 1 or −1, and the signal S is applied equally to two convolvers.

The first and second reference signals Rf1 and Rf2 entered in two convolvers are expressed by:

$$R_{f1} = V_{r1}(t) = \overline{P_1(t)}\text{COS}(\omega_0 t) \quad (2)$$

$$R_{f2} = V_{r2}(t) = \overline{P_2(t)}\text{SIN}(\omega_0 t + \theta) \quad (3)$$

where $\overline{P_1(t)}$ and $\overline{P_2(t)}$ are receiver's PN codes $\overline{PN1}$ and $\overline{PN2}$ used in demodulation, and they are mirror images (time-inverted signals) of the transmitter's P1(t) and P2(t).

Respective outputs Vc1 and Vc2 of two convolvers are:

$$V_{c1}(t) = \text{CONV}\{Vd(t), V_{r1}(t)\} \quad (4)$$

$$V_{c2}(t) = \text{CONV}\{Vd(t), V_{r2}(t)\} \quad (5)$$

where CONV{V1(t), V2(t)} indicates a convolution of two inputs V1(t) and V2(t).

When establishing:

$$V_1(t) = \text{COS}(\omega_0 t) \quad (6)$$

$$V_2(t) = \text{COS}(\omega_0 t + \theta) \quad (7)$$

the convolver output CONV{V1(t), V2(t)} is expressed by:

$$\text{CONV}\{V_1(t), V_2(t)\} = \eta \cdot \text{COS}(2\omega_0 + \theta + \phi) \quad (8)$$

where $\eta$ is the efficiency of the convolver $\phi$ is an additive phase inherent in the convolver, and it is acknowledged that the phase change $\theta$ in one input V2(t) appears at the output in the original form.

Since the mutual correlations between P1(t) and $\overline{P2(t)}$ and between P2(t) and $\overline{P1(t)}$ is small, a large error is not produced also when establishing:

$$V_{c1}(t) \doteq \text{CONV}\{P_1(t)\text{SIN}(\omega_0 t), \overline{P_1(t)}\text{COS}(\omega_0 t)\} \quad (9)$$

$$V_{c2}(t) \doteq \text{CONV}\{A \cdot P_2(t)\text{COS}(\omega_0 t), \overline{P_2(t-)}\text{COS}(\omega_0 t + \theta)\} \quad (10)$$

Expressions (9) and (10) can be rewritten into:

$$V_{c1}(t) = \eta_1 \cdot R_1(t)\text{COS}(2\omega_0 t + \phi_1) \quad (11)$$

$$V_{c2}(t) = \eta_2 \cdot A \cdot R_2(t)\text{COS}(2\omega_0 t + \phi_2) \quad (12)$$

where R1(t) and R2(t) are convolutions between P1(t) and $\overline{P1(t)}$ and P2(t) and $\overline{P2(t)}$, respectively, and $\phi_1$ and $\phi_2$ are additional phases inherent in respective convolvers.

When an output Vm(t) after multiplication of Vc1(t) and Vc2(t) is expressed by:

$$\begin{aligned} Vm(t) &= V_{C1}(t) \cdot V_{C2}(t) \\ &= \eta_1 \cdot \eta_2 \cdot A \cdot R_1(t) \cdot R_2(t) \cdot \text{COS}(2\omega_0 t + \phi_1) \cdot \\ & \quad \text{COS}(2\omega_0 t + \theta + \phi_2) \end{aligned} \quad (13)$$

where $$\theta + \phi_2 = \phi_1 - \pi/2 \quad (14)$$

the following equation is established:

$$\begin{aligned} Vm(t) &= \eta_1 \cdot \eta_2 \cdot A \cdot R_1(t) \cdot R_2(t) \cdot \text{SIN}(2\omega_0 t + \phi_1) \cdot \\ & \quad \text{COS}(2\omega_0 t + \phi_1 - \pi/2) \\ &= \eta_1 \cdot \eta_2 \cdot A \cdot R_1(t) \cdot R_2(t) \cdot \text{SIN}^2(2\omega_0 t + \phi_1) \end{aligned} \quad (15)$$

The demodulation signal Vf(t) obtained by filtering Vm(t) through the low-pass filter is expressed by:

$$V_f(t) = \eta_1 \cdot \eta_2 \cdot A \cdot R_1(t) \cdot R_2(t) \quad (16)$$

Figure 2:
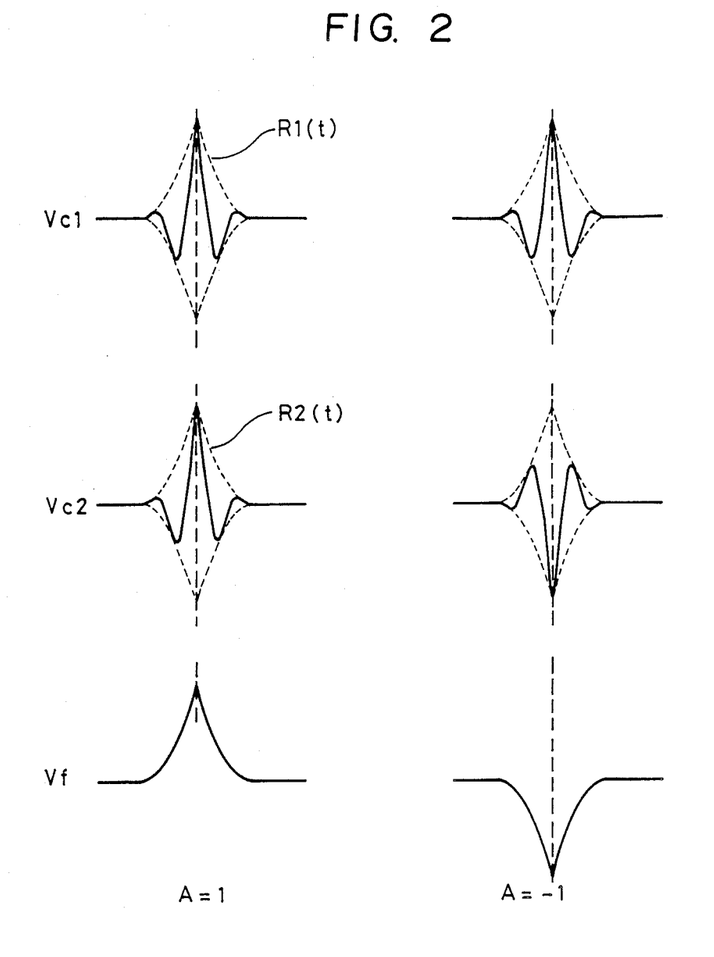
FIG. 2 shows waveforms to explain an operation of the embodiment of FIG. 1.

FIG. 2 shows waveforms of Vc1(t), Vc2(t) and Vf(t) when $\phi_1 = \phi_2$. From FIG. 2 and equation (16) it is known that the arrangement of FIG. 2 enables data demodulation.

In the above-described spread spectrum receiver, the invention particularly employs the automatic gain control circuit 14 positioned between the low-pass filter 13 and the variable gain amplifiers 10 and 11 and configured to control gains of the amplifiers in response to the multiplication output of the multiplier 12 so as to prevent saturation of outputs of the amplifiers 10 and 11.

Therefore, as understood from the above-described arrangement, the invention is configured to perform indirect gain control of the amplifiers 10 and 11 in response to the multiplication output of the subsequent stage thereof, in lieu of direct gain control responsive to outputs of the amplifiers in the prior art system.

In the spread spectrum receiver of FIG. 1, the correlator is made of two convolvers, and respective correlation outputs are entered in a single multiplier so as to obtain a single multiplication output as a demodulation output. Taking this arrangement of the correlation demodulation system into consideration, the inventive gain control system is configured so that the gain control circuit 14 controls gains of the amplifiers 10 and 12 concurrently in response to the afore-mentioned single multiplication output.

Apparently, the inventive gain control system may be used not only in an arrangement using two convolvers as the correlator but also in any other arrangement capable of producing at least two correlation outputs.

Figure 3:
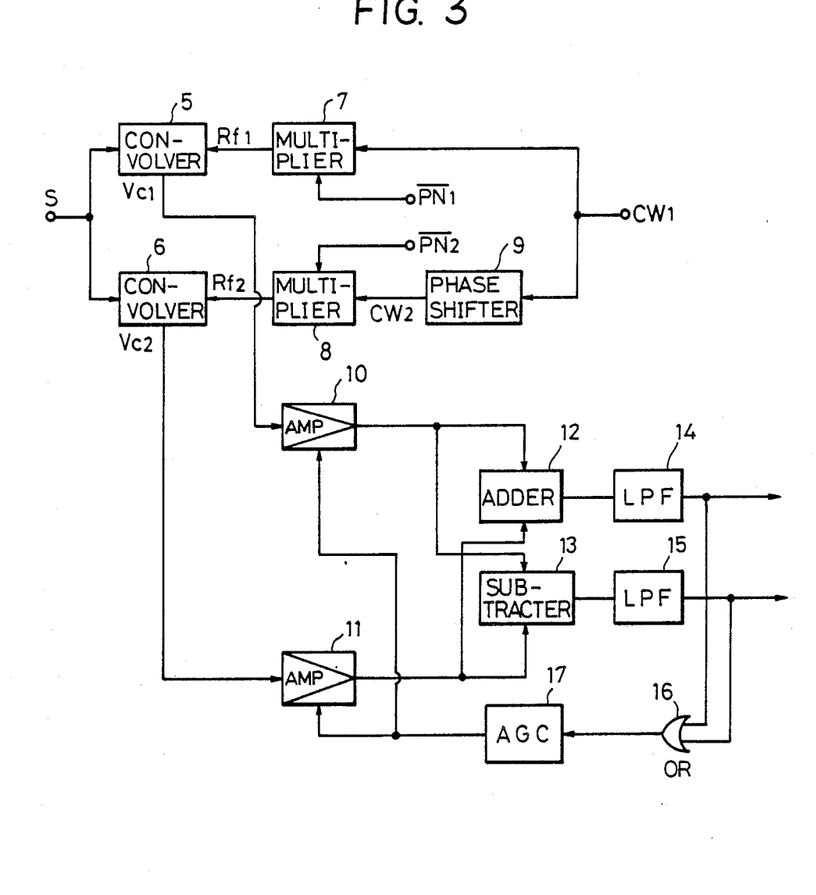
FIG. 3 is a block diagram of a further embodiment of the invention.

The same automatic gain control system may be used also in a spread spectrum receiver using an adder and a subtractor as the demodulator as shown in FIG. 3.

Figure 6:
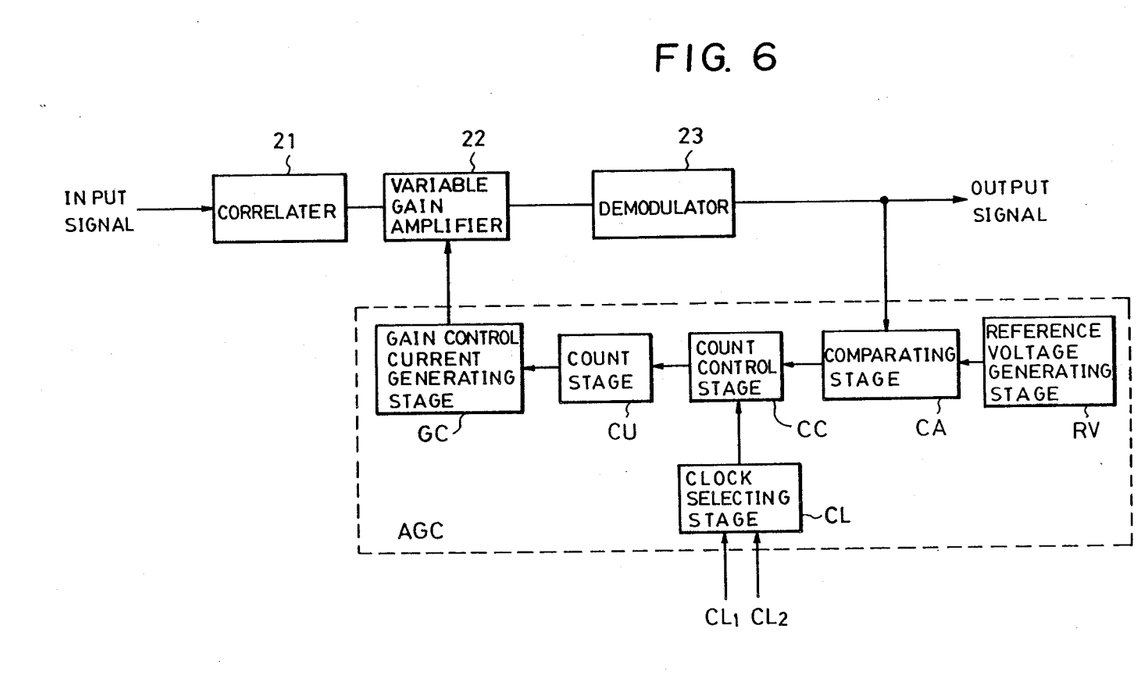
FIG. 6 is a block diagram showing a general arrangement of a second embodiment of the invention.

FIG. 6 shows a further embodiment of the invention in which an inventive automatic gain control system is used in a spread spectrum receiver. In the drawing, reference numeral 21 refers to a correlator, 22 to a variable gain amplifier, 23 to a demodulator and AGC to an AGC circuit responsive to an output of the demodulator 23 to control the gain of the variable gain amplifier 22.

The AGC circuit is made of a comparison stage CA, a reference voltage generating stage RV, a count control stage CC, a clock selecting stage CL, a count stag CU and a gain control current generating stage GC.

Figure 7:
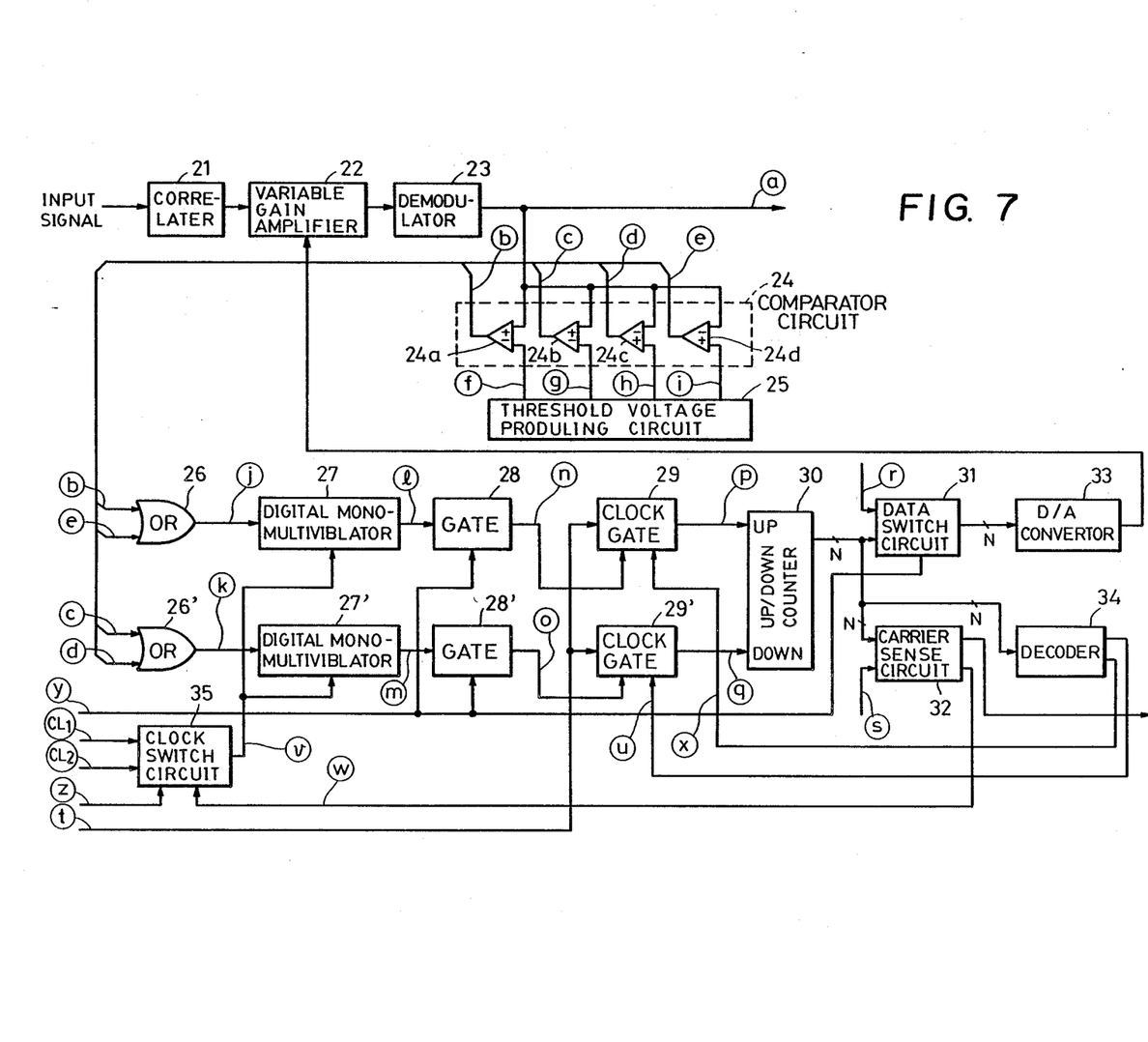
FIG. 7 is a block diagram of the second embodiment of the invention.

The comparison stage CA may be made of a comparator circuit 24 as shown in FIG. 7, and the reference voltage generating stage RV may have a threshold voltage producing circuit 25. The count control stage CC includes absolute value circuits 26 and 26', digital mono-multivibrators 27 and 27', gates 28 and 28' and clock gates 29 and 29'.

The clock selecting stage CL consists of a clock switch circuit 35, the count stage CU includes an up-/down counter 30 and a decoder 34, and the gain control current generating stage GC consists of a D/A converter. Reference numeral 31 denotes a data switch circuit, and 2 denotes a carrier sense circuit.

The comparator 24 includes four comparators 24a through 24d having plus (+) terminals supplied with an output of the demodulator 23 and minus (−) terminals supplied with threshold voltages f and g of the threshold voltage generating circuit 25. Minus (−) terminals of the comparators 24c and 24d are supplied with an output of the demodulator 23, and plus (+) terminals thereof are supplied with threshold voltages h and i of the circuit 25.

The absolute value circuits 26 and 26' may consist of OR circuits, for example, which are supplied with comparison outputs b through e of respective comparators, and outputs of the circuits 26 and 26 pass through the mono-multivibrators 27—27', gates 28—28' and clock gates 29—29' and reach up and down terminals UP and DOWN of the up/down counter 20.

The counter 20 gives its output to the D/A converter 23 via the data switch circuit 31, and the gain of the variable gain amplifier 22 is controlled by an output of the D/A converter 23.

In the arrangement of FIG. 6, a correlation spike supplied from the demodulator 23 is compared in the comparison stage CA with positive or negative two threshold voltages supplied from the reference voltage generating stage RV and selected according to the polarity of the correlation spike. Responsively to a comparison result, the count stage CC selects a clock from the clock selecting stage CL and gives it to the count stage CU which responsively counts it in the positive or negative direction. The gain control current generating stage GC produces a current corresponding to the counted value, and the gain of the variable gain amplifier 22 is controlled to hold the correlation spike between the positive or negative threshold voltages. These operations are further described below, referring to the embodiment of FIG. 7.

Figure 8:
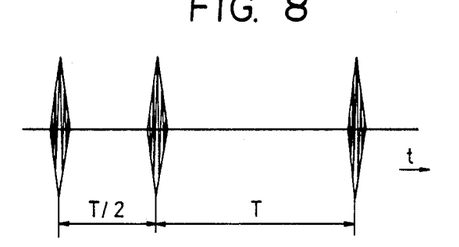
FIGS. 8 through 12 show waveforms to explain operations of the embodiment.
Figure 9:
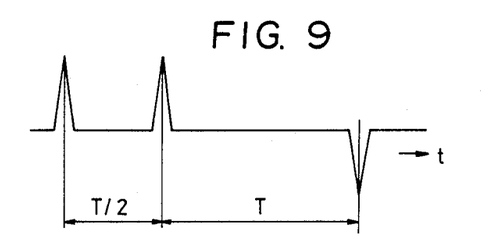

In FIG. 7, the correlator 21 produces a high-frequency, intermittent correlation spike at every T interval when, for example, all data which has been spread-spectrum-demodulated is a sequence of "1" or "0", and varies at T/2 interval as shown in FIG. 8 (where T is one period of a PN code used for spread spectrum of data. The correlation spike is amplified by the variable gain amplifier 22 and demodulated by the demodulator 23 to obtain a base band signal a shown in FIG. 9.

Figure 10:
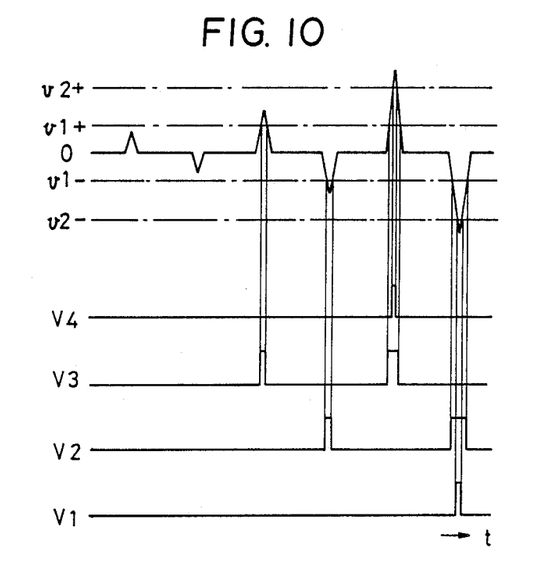

The comparator 24 is supplied from the threshold voltage generating circuit 25 with threshold voltages v2+f, v1+g, v1−h and v2−i shown in FIG. 10.

When the base band signal a exceeds v1+, v3c is outputted, and when it exceeds v2+, v4b and v3c are outputted.

When the base band signal a is below v1−, v2d is outputted, and when it is below v2−, v1e and v2d are outputted.

The absolute value circuit 26 is supplied with v4b and v1e whereas the other absolute value circuit 26' is supplied with v3c and v2d. These circuits 26 and 26' perform respective OR operations and obtain signals j and k. These relationships are shown in FIG. 11.

An aimed operation of the AGC circuit of FIG. 7 is to control the variable gain amplifier based on these signals so as to maintain the positive peak of the base band signal a between the threshold levels v1+ and v2+ and the negative peak between the threshold levels v1− and v2−.

Figure 11:
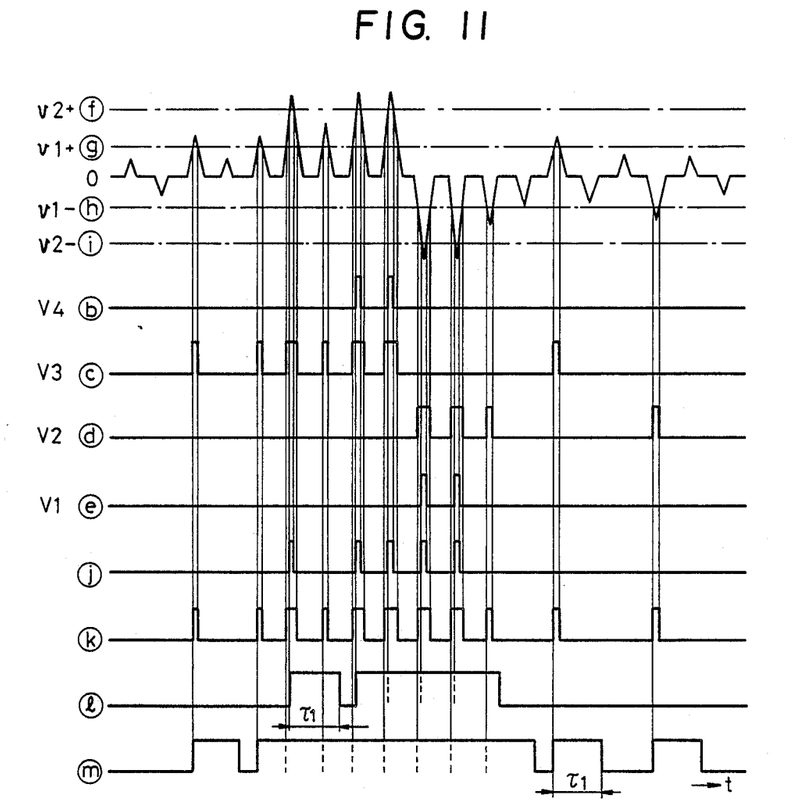

The digital mono-multivibrators 27 and 27', as shown in FIG. 11 is triggered by signals j and k and obtains pulse signals l and m of τ1. Referring to FIG. 8, τ1 selectively exhibits T/2<τ1<T corresponding to the correlation spike at T/2 interval and T/2<τ1<2T corresponding to the correlation spike at T interval, and one of them can be selected by switching the time clock v of the digital mono-multivibrators by the clock switch circuit 35. This is because the AGC may be erroneously operated by a noise when outputs l and m of the monovibrators are below one period of correlation peaks, and the AGC will become dull in its operation when the correlation peak exceeds 2 periods.

The gates 28 and 28' are responsive to a control signal ⊕ in adjustment of the receiver to prevent signals l and m from appearing at outputs of the gates 28 and 28' and to maintain signals n and o in condition D in Table 1.

TABLE 1

| condition | signal l | signal m | control signal + | signal n | signal o |
|---|---|---|---|---|---|
| A | L | L | H | L | L |
| B | L | H | H | L | H |
| C | H | H | H | H | H |
| D | X | X | L | L | H |

The clock gates 29 and 29' are responsive to output signals n and o of the gates 28—28', and UP count prohibit signal x and a DOWN count prohibit signal u to control the count clock t and produce an UP pulse p and a DOWN pulse q as shown in Table 2.

TABLE 2

| condition | signal n | signal o | UP count prohibit signal x | DOWN count prohibit signal u | count pulse t | UP pulse p | DOWN pulse q |
|---|---|---|---|---|---|---|---|
| A | L | L | H | H | ⎍ | H | ⎎ |
| B | L | H | H | H | ⎍ | H | H |
| C | H | H | H | H | ⎍ | ⎎ | H |
| D | L | L | L | H | ⎍ | H | ⎎ |
| E | L | H | L | H | ⎍ | H | H |
| F | H | H | L | H | ⎍ | H | H |
| G | L | L | H | L | ⎍ | H | H |
| H | L | H | H | L | ⎍ | H | H |
| I | H | H | H | L | ⎍ | ⎎ | H |

The up/down counter 30 is triggered by the UP pulse p and the DOWN pulse q to effect a counting operation and outputs binary data of N bits.

The data switch circuit 31 is responsive to the control signal ⊕ entered upon adjustment of the receiver to switch the output to data r and fix the gain of the variable gain amplifier 22 to a fixed value.

The D/A converter 33 analog-converts an output of N bits of the data switch circuit and gives it to the variable gain amplifier 22 to control the gain. The D/A converting operation of the D/A converter 33 is done well when using a non-linear D/A converter to effect a linear control by correcting the control characteristic of the variable gain amplifier 22.

It is not desirable that the counter 30 operates as a ring counter and causes all the N bits of the output to exhibit "0" due to UP pulses subsequent to "1" or oppositely change to "1" from all "0" condition due to subsequent DOWN pulses. In this connection, the decoder 34 decodes the output of the counter, and when all the N bits are "1", produces an UP count prohibit signal x, and when all the N bits exhibit "0", produces a DOWN count prohibit signal u to control the clock gate circuits 29 and 29' in order to prohibit an UP counting from all "1" condition to all "0" condition and prohibit a DOWN counting from all "0" condition to all "1" condition.

The carrier sense circuit 32 compares the output of the counter with the data s, and when the value of the counter output is larger than the data s, produces a carrier sense signal w.

Figure 12:
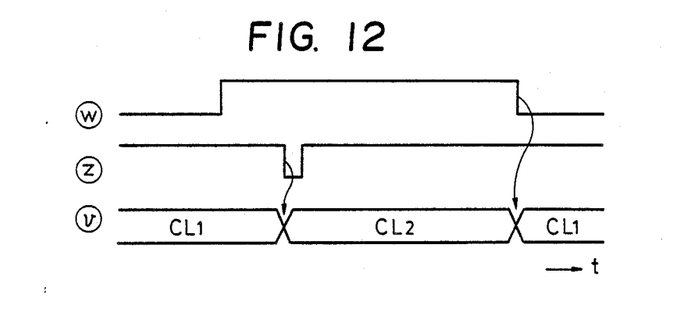

The clock switch circuit 35 switches clocks CL1 and CL2 in response to a control signal z and the carrier sense signal w, and produces a time clock v as shown in FIG. 12.

Therefore, the AGC circuit operates to output a DOWN pulse in condition A or D in Table 2, effect a DOWN counting and increase the gain of the variable gain amplifier. This is effected when the base band signal a is above the threshold voltage v1+ and not below v1—, i.e., when the level of the base band signal a is small.

Further, the AGC circuit operates to an UP pulse to effect an UP counting in condition C or I and reduce the gain of the variable amplifier. This is effected when the base band signal a is above the threshold voltage v2+ or below v2—, i.e., when the base band signal level is large.

In this fashion, condition B, E or H is finally established where the value of the counter does not change and hence the gain of the variable gain amplifier does not change. As a result, the positive peak of the base band signal a is positioned between the threshold levels v1+ and v2+, and the negative peak thereof is positioned between the threshold levels v1— and v2—, so that the aimed object of the AGC circuit of FIG. 7 is attained.

Since the AGC circuit of FIG. 7 uses a correlation spike having both the positive and negative polarities, it has two threshold voltages respectively and has the absolute value circuits 26 and 26' at positive and negative sides. However, if the correlation spike has a waveform of the positive or negative part alone, the threshold voltages are only two in either polarity, and the absolute value circuits 26 and 26' are not required.

Although a circuit using the up/down counter has been described heretofore, the same operation can be performed by using a CPU in lieu of the up/down counter for software processing or by using a bi-directional shift register.

As described above, according to the invention, also when two convolvers are used as a correlator, detection of correlation outputs of respective amplifiers is not necessary. Further, since the gains of the amplifiers are controlled simultaneously using a single multiplication output and not by individual control, the circuit arrangement is simplified and the manufacturing cost is reduced.

Additionally, the invention provides an excellent AGC circuit in a spread spectrum receiver which reliably prevents erroneous operations caused by noises and permits a free selection of the control range without adjustment.

What is claimed is:

1. An automatic gain control system in a spread spectrum receiver comprising:
   correlation means for correlating a reference signal and spread spectrum signal received by the receiver;
   a demodulator for demodulating data from a correlation output from said correlation means;
   variable gain amplifier means provided between said correlation means and said demodulator to amplify said correlation output; and
   gain control means responsive to a demodulation output from said demodulator for controlling the gain of said variable gain amplifier means.

2. An automatic gain control system according to claim 1 wherein said correlation means is configured to produce two correlation outputs, and said variable gain amplifier means includes two variable gain amplifiers each processing one of said correlation outputs responsively to the output of said gain control means so that the gain of said amplifiers are controlled by said gain control means.

3. An automatic gain control system according to claim 1 wherein said gain control means includes means for comparing a correlation spike from said demodulator with positive or negative two threshold voltages according to the polarity of the correlation spike; and means responsive to a comparison output from said comparison means to control the gain of said variable gain amplifier means to maintain the peak of said correlation spike between said positive or negative two threshold voltages.

4. An automatic gain control system according to claim 1 wherein said gain control means includes means for comparing a correlation spike from said demodulator with positive or negative two threshold voltages according to the polarity of the correlation spike; means responsive to a comparison output from said comparison means to control the counting operation of reversible counting means; and means responsive to a counting output from said reversible counting means for controlling the gain of said variable gain amplifier means so as to maintain the peak of said correlation spike between said positive or negative two threshold voltages.

5. An automatic gain control system according to claim 1 wherein said gain control means includes means for comparing a correlation spike from said demodulator with positive or negative two correlation threshold voltages according to the polarity of the correlation spike; a mono-multivibrator triggered by a comparison output from said comparison means and producing outputs continuously for a predetermined time; means responsive to an output from said mono-multivibrator to control the counting operation of reversible counting means; and means responsive to a counting output from said reversible counting means to control the gain of said variable gain amplifier means so as to maintain the peak of said correlation spike between said positive or negative two threshold voltages.

6. An automatic gain control system according to claim 1 wherein said gain control means includes means for comparing a correlation spike from said demodulator with positive or negative threshold voltages according to the polarity of the correlation spike; means responsive to a comparison output from said comparison means to control the counting operation of reversible counting means; means for D-A converting a counting output from said reversible counting means; and means responsive to a conversion output from said conversion means to control the gain of said variable gain amplifier means.

7. An automatic gain control system according to claim 5 wherein said output generating time of said mono-multivibrator is longer than the period of said correlation spike.

8. An automatic gain control system according to claim 5 wherein said output generating time of said mono-multivibrator may be controlled by an external signal.

9. An automatic gain control system according to claim 1 wherein said demodulator is a multiplier.

10. An automatic gain control system according to claim 2 wherein said demodulator comprises an adder and a subtractor which are supplied with two correlation outputs.

11. An automatic gain control system according to claim 2 wherein said correlation means consists of two convolvers individually connected respectively to said variable amplifiers.

12. An automatic gain control system according to claim 6 wherein said D-A conversion means consists of a non-linear D-A converter having a characteristic chosen to compensate the non-linear characteristic of said variable gain amplifier means.

* * * * *